US012711338B2

(12) United States Patent
Au et al.

(10) Patent No.: US 12,711,338 B2
(45) Date of Patent: Aug. 18, 2026

(54) DUAL MODE AIMER FOR LONG RANGE BARCODE SCANNING

(71) Applicant: Hand Held Products, Inc., Charlotte, NC (US)

(72) Inventors: Ka Au, Charlotte, NC (US); Gang Chen, Charlotte, NC (US); Xiuliang Wang, Charlotte, NC (US); Tao Xian, Charlotte, NC (US); Jun Yin, Charlotte, NC (US)

(73) Assignee: Hand Held Products, Inc., Charlotte, NC (US)

( * ) Notice: Subject to any disclaimer, the term of this patent is extended or adjusted under 35 U.S.C. 154(b) by 0 days.

(21) Appl. No.: 19/169,445

(22) Filed: Apr. 3, 2025

(65) Prior Publication Data

US 2025/0328740 A1 Oct. 23, 2025

(30) Foreign Application Priority Data

Apr. 19, 2024 (CN) ........................ 202410479317.1

(51) Int. Cl.
*G06K 7/10* (2006.01)
*G01S 17/08* (2006.01)
*G06K 7/14* (2006.01)

(52) U.S. Cl.
CPC .......... *G06K 7/10801* (2013.01); *G01S 17/08* (2013.01); *G06K 7/1413* (2013.01)

(58) Field of Classification Search
CPC .. G06K 7/1404; G06K 7/1408; G06K 7/1413; G06K 7/1417; G06K 7/10544; G06K 7/10722; G06K 7/10801; G06K 2207/1011; G01S 17/08
See application file for complete search history.

(56) References Cited

U.S. PATENT DOCUMENTS 9,202,094 B1 12/2015 Chen et al.
10,929,623 B2 2/2021 Wittenberg et al.
2009/0057413 A1 3/2009 Vinogradov et al.
2009/0084851 A1* 4/2009 Vinogradov ............. G06K 7/14 235/462.21
2010/0155481 A1* 6/2010 Vinogradov ........... G06K 7/109 235/462.41
2012/0181338 A1* 7/2012 Gao ......................... G06K 7/12 235/455
2015/0339506 A1 11/2015 Chen et al.
2018/0352060 A1* 12/2018 Gifford ............... H04M 1/0264
2022/0187459 A1 6/2022 Perugini et al.

* cited by examiner

*Primary Examiner* — Laura A Gudorf
(74) *Attorney, Agent, or Firm* — Alston & Bird LLP

(57) ABSTRACT

A scanner comprising at least one laser source configured to emit laser beam onto a first target within a field of view (FOV). Further, one or more sensors are configured to determine a distance between the scanner and the first target within the FOV. Further, one or more processors are operationally coupled with the at least one laser source and the one or more sensors. Further, the one or more processors are configured to receive the distance from the one or more sensors. Further, the one or more processors are configured to compare the distance with a predefined threshold value to determine whether the first target is in far-field. Thereafter, the one or more processors are configured to operate the at least one laser source in a flicking-aimer mode on determining the first target is in far-field.

20 Claims, 4 Drawing Sheets

DUAL MODE AIMER FOR LONG RANGE BARCODE SCANNING

CROSS-REFERENCE TO RELATED APPLICATION

This application claims priority pursuant to 35 U.S.C. 119(a) to Chinese Patent Application No. 202410479317.1, filed Apr. 19, 2024, which application is incorporated herein by reference in its entirety.

TECHNOLOGICAL FIELD

Example embodiments of the present disclosure relate generally to a barcode scanner, and more particularly to a barcode scanner with dual modes for scanning in the near-field and the far-field.

BACKGROUND

A barcode scanner or a barcode reader is an electronic input device that can read and decode barcodes. The barcode scanner uses an optical technology such as alight to read the printed barcodes. The barcode scanner consists of a light source, a lens, and a light sensor for translating optical impulses into electrical signals. Typically, the barcode scanner is categorized into laser-based scanners and image-based scanners. The image-based scanners are most commonly used for long range scanning operations. The image-based scanner projects an illumination light towards the barcodes while scanning to enhance contrast and visibility of the barcode. The typical image-based scanner comprises imaging sensors that captures the reflected or scattered from the barcode. The image-based scanners either emit a continuous light towards the barcode or a fluctuating light towards the barcode to enhance contrast and visibility of the barcode. The emitted laser pulses represent a dot or a pattern on the barcodes. During long range application, user(s) find difficulty while pointing the dot or pattern on the barcodes. Conventional barcode scanners often face limitations in effectively targeting and decoding barcodes placed at extended ranges. At extended distances, accurately aiming and targeting barcodes becomes challenging due to reduced visibility and precision in the conventional barcode scanners. This can lead to errors in scanning or slower scanning speeds, affecting overall efficiency.

Applicant has identified a number of deficiencies and problems, and through applied effort, ingenuity, and innovation, many of these identified problems have been solved by developing solutions that are included in embodiments of the present disclosure, many examples of which are described in detail herein.

BRIEF SUMMARY

The following presents a simplified summary to provide a basic understanding of some aspects of the present disclosure. This summary is not an extensive overview and is intended to neither identify key or critical elements nor delineate the scope of such elements. Its purpose is to present some concepts of the described features in a simplified form as a prelude to the more detailed description that is presented later.

In an example embodiment, a scanner is disclosed. The scanner comprises at least one laser source configured to emit laser beam onto a first target within a field of view (FOV). Further, one or more sensors are configured to determine a distance between the scanner and the first target within the FOV. Further, one or more processors are operationally coupled with the at least one laser source and the one or more sensors. Further, the one or more processors are configured to receive the distance from the one or more sensors. Further, the one or more processors are configured to compare the distance with a predefined threshold value to determine whether the first target is in the far-field. Thereafter, the one or more processors are configured to operate the at least one laser source in a flicking-aimer mode on determining the first target is in the far-field.

In some embodiments, the one or more sensors comprises at least one of a distance sensor or a complementary metal-oxide-semiconductor (CMOS) sensor. Further, the CMOS sensor is configured to determine one or more parameters associated with images of the first target generated by the CMOS sensor, for determining the distance between the scanner and the first target. In some embodiments, the one or more parameters associated with the images comprises at least one of exposure time, gain, or white value.

In some embodiments, the one or more processors are further configured to compare the distance with the predefined threshold value to determine whether the first target is in the near-field. Thereafter, the one or more processors are further configured to operate the at least one laser source in a stable-aimer mode on determining the first target is in the near-field.

In some embodiments, the one or more processors are further configured to determine, on determining the distance is above a predefined threshold value, the first target is in the far-field. Further, the one or more processors are further configured to determine, on determining the distance between the scanner and the first target is below or equal to a predefined threshold value, the first target is in the near-field.

In some embodiments, the laser beam emitted by the at least one laser source in the stable-aimer mode is a dot or a pattern. In some embodiments, the laser beam emitted by the at least one laser source in the flicking-aimer mode is a flicker, an anti-flicker aimer pulse, or a low frequency aimer pulse. In some embodiments, in the flicking-aimer mode, a drive pulse frequency of the at least one laser source comprises at least one of a fixed duty cycle, variable duty cycle, or variable frequency. In some embodiments, in the flicking-aimer mode, the laser beam corresponds to the anti-flicker aimer pulse in which an individual aimer pulse timing is shifted to avoid an illumination period and sensor exposure period, and the low frequency aimer pulse is added on a top of the anti-flicker aimer pulse to draw user attention in the far field. In some embodiments, the anti-flicker aimer pulse defines a frequency of around 50 Hertz or higher and the low frequency aimer pulse defines a frequency of below around 10 Hertz.

In some embodiments, the at least one laser source comprises at least one of a laser aimer, a semiconductor diode laser, a gas laser, a fiber laser, or a quantum cascade laser.

In another example embodiment, a method is disclosed. The method comprises emitting, with at least one laser source, a laser beam onto a first target within a field of view (FOV). The method further comprises steps of determining, via one or more sensors, a distance between a scanner and the first target within the field of view (FOV). The method further comprises comparing, via one or more processors, the distance with a predefined threshold value, to determine whether the first target is in the far-field. The method further comprises operating, via the one or more processors, at least one laser source in a flicking-aimer mode on determining the first target is in the far-field.

The above summary is provided merely for purposes of summarizing some exemplary embodiments to provide a basic understanding of some aspects of the disclosure. Accordingly, it will be appreciated that the above-described embodiments are merely examples and should not be construed to narrow the scope or spirit of the disclosure in any way. It will be appreciated that the scope of the disclosure encompasses many potential embodiments in addition to those here summarized, some of which are further explained within the following detailed description and its accompanying drawings.

BRIEF DESCRIPTION OF THE DRAWINGS

Figure 1:
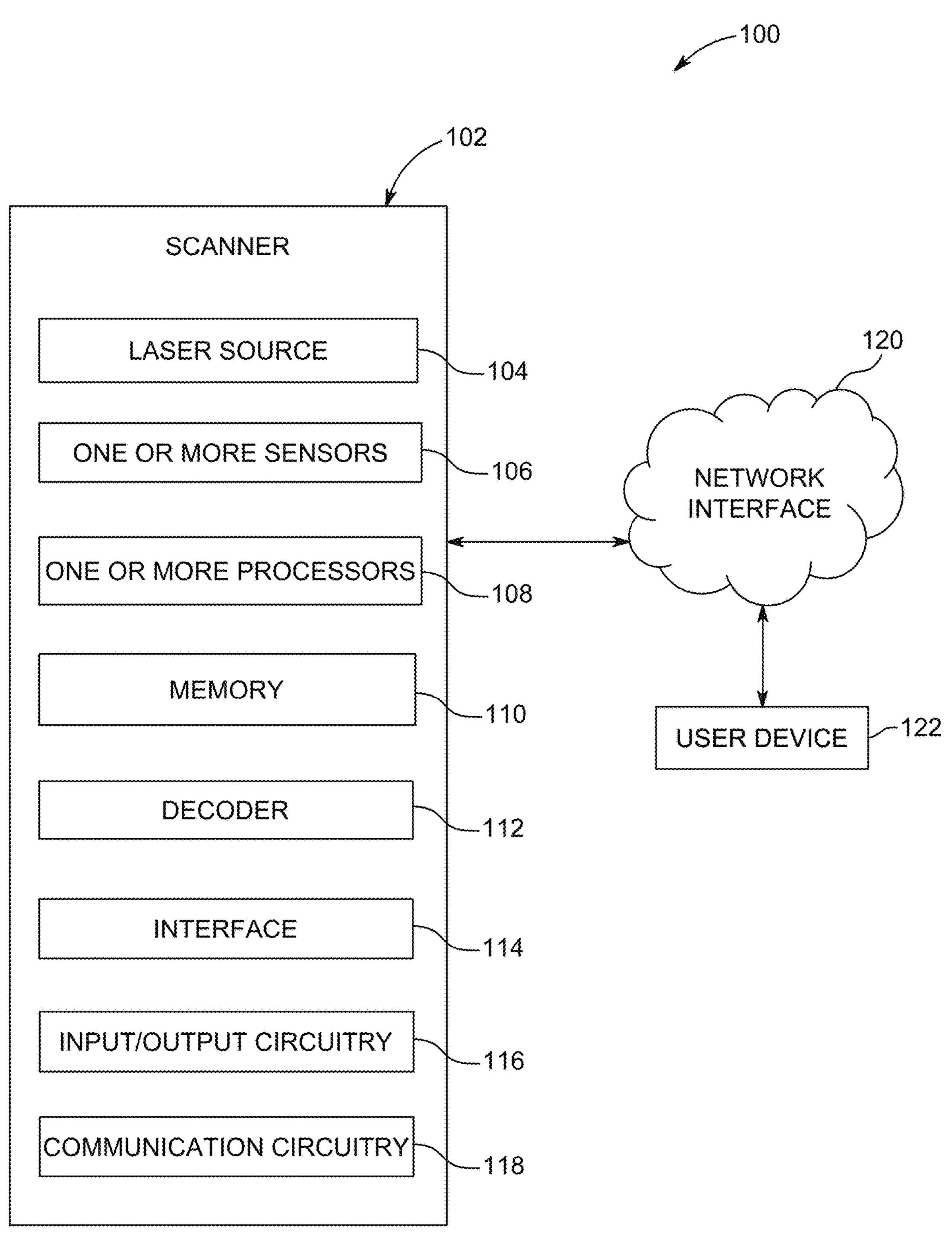
Figure 2A:
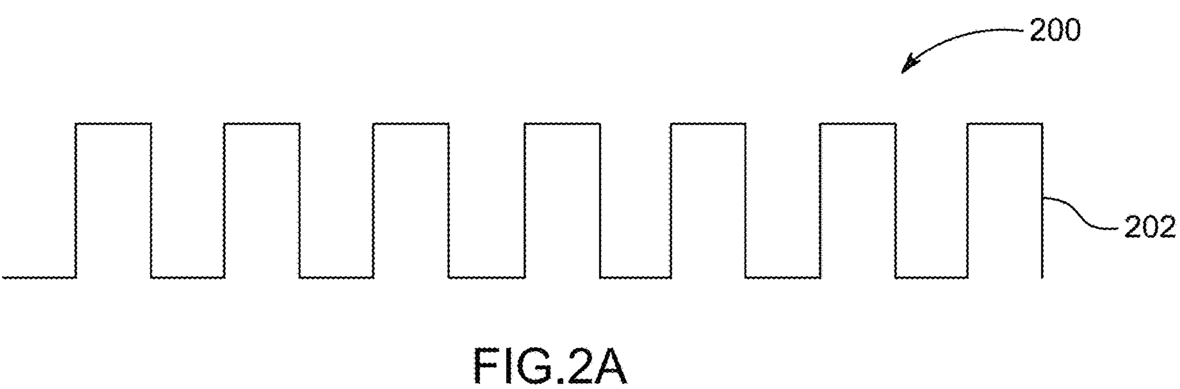
Figure 2B:
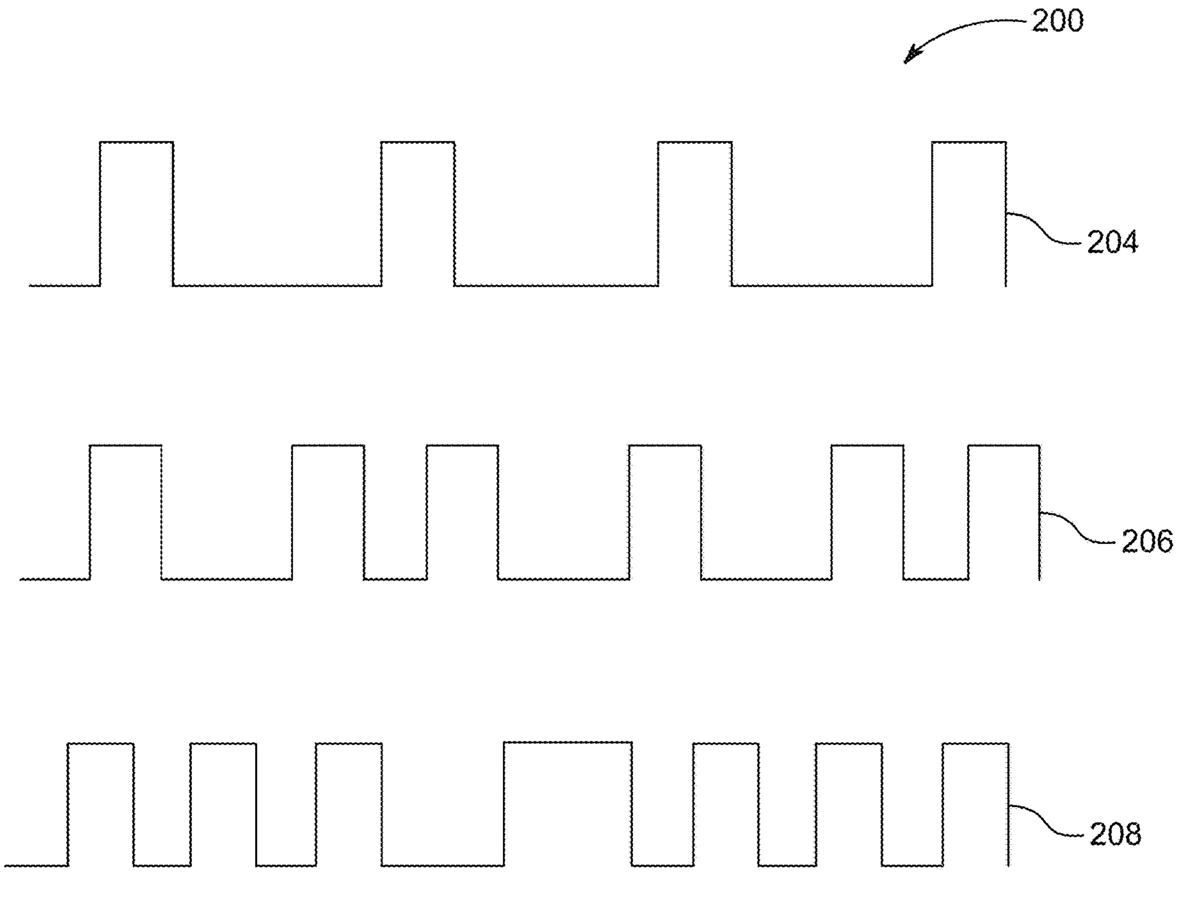
Figure 3:
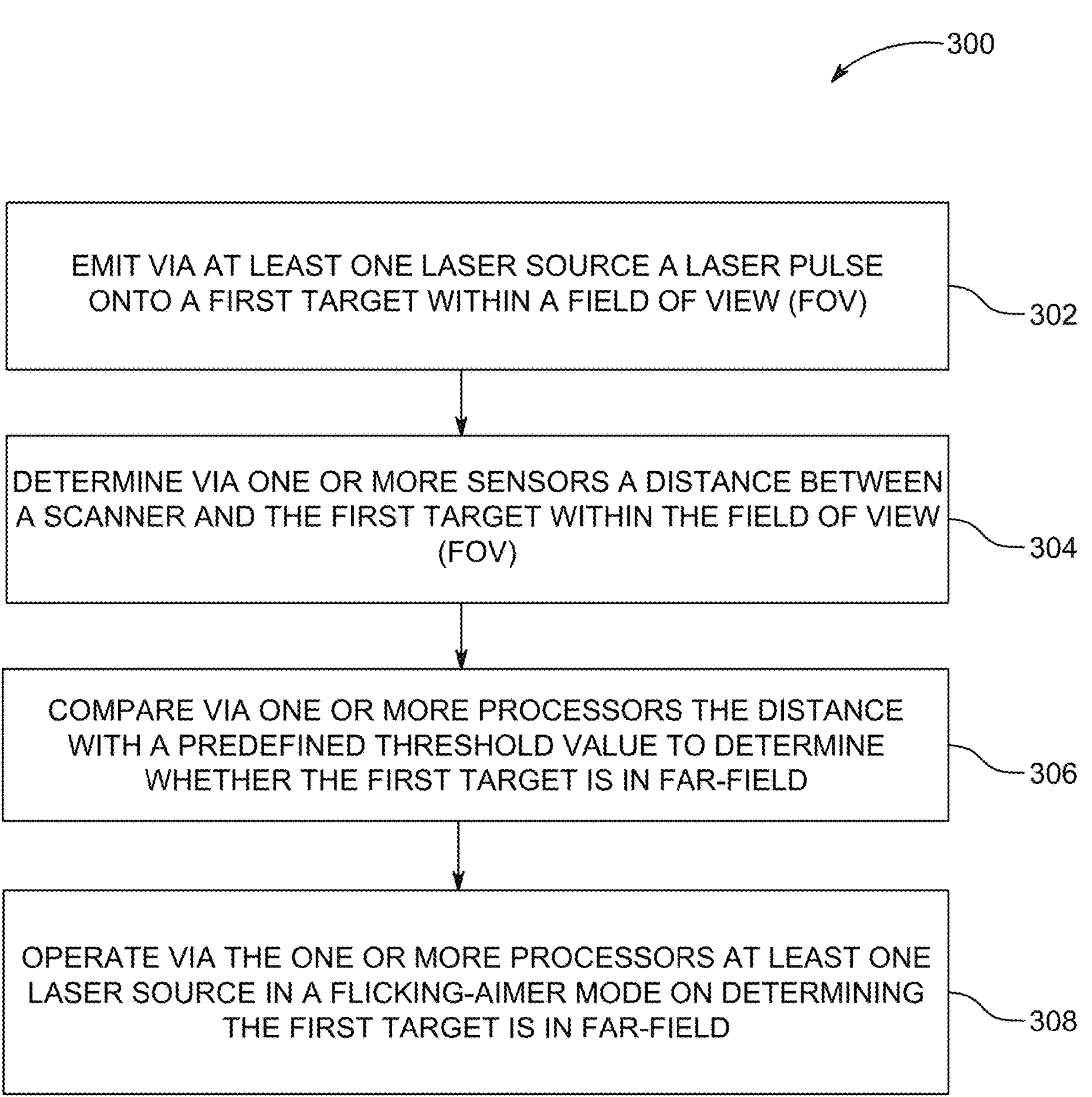
Figure 4:
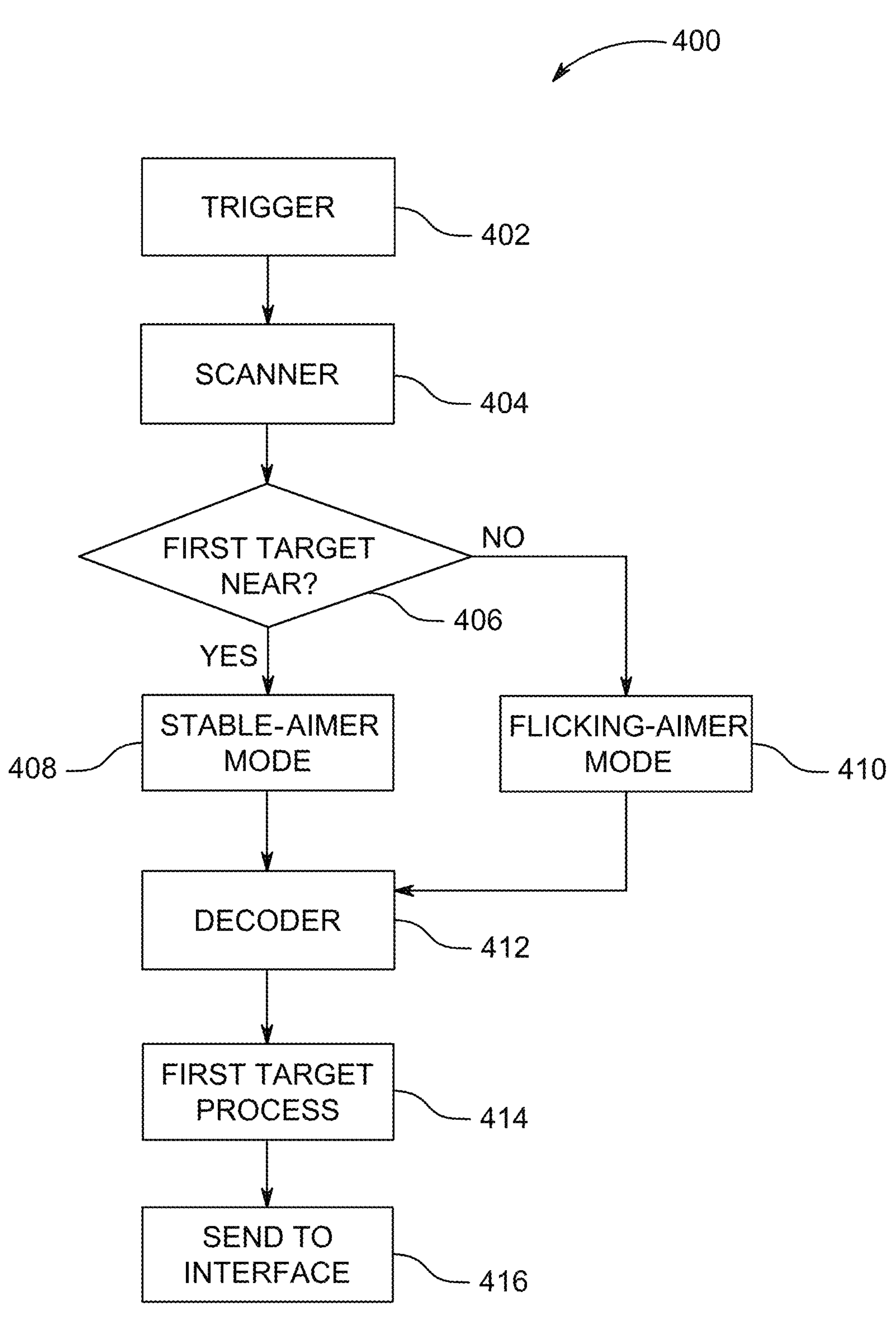

Having thus described certain example embodiments of the present disclosure in general terms, reference will hereinafter be made to the accompanying drawings, which are not necessarily drawn to scale, and wherein:

FIG. 1 illustrates a block diagram of a scanner in accordance with one or more embodiments of the present disclosure;

FIG. 2A illustrates a drive pulse frequency of at least one laser source in a stable-aimer mode in accordance with one or more embodiments of the present disclosure;

FIG. 2B illustrates a drive pulse frequency of the at least one laser source in a flicking-aimer mode in accordance with one or more embodiments of the present disclosure;

FIG. 3 illustrates a first flowchart of a method for scanning a first target in accordance with one or more embodiments of the present disclosure; and, FIG. 4 illustrates a second flowchart of a method for scanning the first target in accordance with one or more embodiments of the present disclosure.

DETAILED DESCRIPTION

The exemplary embodiments described herein provide detail for illustrative purposes and are subject to many variations in structure and design. It should be appreciated, however, that the embodiments are not limited to a particularly disclosed embodiment shown or described. It is understood that various omissions and substitutions of equivalents are contemplated as circumstances may suggest or render expedient, but these are intended to cover the application or implementation without departing from the spirit or scope of the claims.

Also, it is to be understood that the phraseology and terminology used herein is for the purpose of description and should not be regarded as limiting. The terms “a,” “an,” and “the” herein do not denote a limitation of quantity, but rather denote the presence of at least one of the referenced object. It will be further understood that the terms “comprises” and/or “comprising,” when used in this specification, specify the presence of stated features, integers, steps, operations, elements, and/or components, but do not preclude the presence or addition of one or more other features, integers, steps, operations, elements, components, and/or groups thereof. Like numerals represent like parts in the figures.

Embodiments of the present disclosure will be described more fully hereinafter with reference to the accompanying drawings in which like numerals represent like elements throughout the several figures, and in which example embodiments are shown. Embodiments of the present disclosure may, however, be embodied in alternative forms and should not be construed as being limited to the embodiments set forth herein. The examples set forth herein are non-limiting examples and are merely examples among other possible examples.

The present invention provides various embodiments of a scanner. Embodiments may be configured to emit laser beam onto a first target within a field of view (FOV) by at least one laser source. Embodiments may be configured to determine a distance between the scanner and the first target via one or more sensors. Embodiments may be configured to operate the at least one laser source in a flicking-aimer mode or in a stable-aimer mode based at least on the distance determined. Embodiments may be configured to emit a laser beam via the at least one laser source in a dot or a pattern when working in the stable-aimer mode. Embodiment may be configured to emit a laser beam via the at least one laser source in a flicker when working in the flicking-aimer mode.

FIG. 1 illustrates a block diagram 100 of a scanner 102 in accordance with one or more embodiments of the present disclosure. FIG. 2A illustrates a drive pulse frequency 200 of at least one laser source 104 in a stable-aimer mode in accordance with one or more embodiments of the present disclosure. FIG. 2B illustrates a drive pulse frequency 200 of the at least one laser source 104 in a flicking-aimer mode in accordance with one or more embodiments of the present disclosure.

In some embodiments, the scanner 102 may comprise at least one laser source 104, one or more sensors 106, one or more processors 108, a memory 110, a decoder 112, and an interface 114. In some example embodiments, the scanner 102 may be encapsulated inside a housing (not shown). In an example embodiment, at least one push button (not shown) may be integrated onto the housing. In some embodiments, the at least one push button may be pressed by a user to trigger the scanner 102 while pointing the scanner 102 towards at least one target (not shown). In some embodiments, the housing may further comprise at least one power source (not shown) that is be configured to supply electric current to various electrical and electronic components encapsulated inside the housing. In some embodiments, the at least one power source may be configured to supply a predefined amount of electric current to the at least one laser source 104.

In some embodiments, the at least one laser source 104 may be configured to emit a laser beam onto a first target within a field of view (FOV). In some embodiments, the at least one laser source 104 may comprise at least one of a laser aimer (not shown), a semiconductor diode laser (not shown), a gas laser (not shown), a fiber laser (not shown), or a quantum cascade laser (not shown). Further, the laser aimer may comprise a laser source, a driving circuitry, and one or more aiming optics. In some embodiments, the laser source of the laser aimer may correspond to a laser diode that may be configured to emit one or more laser beams upon receiving power from a power supply via the driving circuitry. Further, the one or more aiming optics may be configured to concentrate the one or more laser beams emitted in the field of view (FOV) of the laser aimer. In some embodiments, the at least one laser source 104 may be configured to emit a laser beam in a plurality of modes. The plurality of modes may be a stable-aimer mode or a flicking-aimer mode. The description of the stable-aimer mode or flicking-aimer mode is described later in conjunction with FIGS. 2-3. In some embodiments, the at least one laser source 104 may be configured to stimulate emission of coherent light while the predefined amount of electric current is supplied to the at least one laser source 104. In some embodiments, the stimulated emission of coherent light may create one or more narrow and intense laser beam.

In some embodiments, the one or more sensors 106 may be housed inside or mounted on the housing. In some embodiments, the one or more sensors 106 may be configured to determine distance between the scanner 102 and the first target within the FOV. In some embodiments, the one or more sensors 106 may comprise at least one of a distance sensor or a CMOS (Complementary Metal-Oxide Semiconductor) sensor.

In some embodiments, the distance sensor may be configured to determine distance between the scanner 102 and the first target within the FOV. In some embodiments, the distance sensor may comprise at least one of a time-of-flight (ToF) sensor, a LiDAR (Light Detection And Ranging) sensor, etc.

In an exemplary embodiment, the distance sensor may correspond to the time-of-flight sensor, the ToF sensor may be configured to emit one or more light signals within an infrared frequency range towards the first target. The ToF sensor may be configured to calculate the distance between the scanner 102 and the first target by measuring a time duration for the one or more light signals to travel to the first target and reflect back to the scanner 102. In some embodiments, the ToF sensor may be configured to measure the distance between the scanner 102 and the first target by measuring one or more parameters. Further, the one or more parameters may correspond to intensity of the one or more light signals reflected back to the scanner 102, gain of the one or more light signals reflected back to the scanner 102, and exposure of the one or more light signals reflected back to the scanner 102.

In an exemplary embodiment, the distance sensor may correspond to the LiDAR sensor, the LiDAR sensor may be configured to emit one or more laser pulses towards the first target. The LiDAR sensor may be configured to calculate the distance between the scanner 102 and the first target by measuring a time duration for the one or more laser pulses to travel to the first target and reflect back to the scanner 102. The LiDAR sensor may be configured to measure the distance between the scanner 102 and the first target by measuring one or more parameters. Further, the one or more parameters may correspond to intensity of the one or more laser pulses reflected back to the scanner 102, gain of the one or more laser pulses reflected back to the scanner 102, and exposure of the one or more laser pulses reflected back to the scanner 102.

In an exemplary embodiment, the distance between the scanner 102 and the first target may be measured by a beam of light emitted by a laser aimer of the scanner 102 towards the first target. Further, the beam of light reflected from the first target may be captured by at least one sensor and positioning of a reflected spot on the at least one sensor may be analyzed to determine the distance between the scanner 102 and the first target.

In an example embodiment, the CMOS sensor may comprise one or more receivers. In some embodiments, the one or more receivers may include, but are not limited to, photodetectors, an array of light-sensitive pixels, or any other receiver known in the art. In some embodiments, the one or more receivers may be configured to generate images of the first target within the FOV. Further, the images may comprise a plurality of pixels that are configured to store information associated with the first target. In some embodiments, the images may comprise one or more parameters. In some embodiments, the one or more parameters may correspond to at least one of exposure time, gain, or white value. In some embodiments, the CMOS sensor may employ one or more image processing algorithms to determine distance between the scanner 102 and the first target.

In some embodiments, the CMOS sensor may comprise at least one analog to digital converter (ADC) or an array of the at least one ADC. Further, the ADC may be configured to convert the analog signals into digital signals. In some embodiments, the array of ADC may correspond to a formation of one or more ADCs in rows and columns. Further, the ADC of the CMOS sensor may be configured to enhance bandwidth of the CMOS sensor. In some embodiments the one or more parameters may corresponds to amplitude and analog gain of one or more analog signals associated with the plurality of pixels. Further, the one or more parameters may also correspond to exposure of the generated images. In some embodiments, the CMOS sensor may be configured to determine the distance between the scanner 102 and the first target, based at least on the one or more parameters.

In some embodiments, the one or more sensors 106 may be operationally coupled with at least one Analog to Digital Converter (ADC). In some embodiments, the at least one ADC may be configured to fetch one or more analog signals from the one or more sensors 106. In one case, when the at least one ADC may be operationally coupled with the CMOS sensor, the one or more analog signals may correspond to the one or more parameters associated with the images of the first target generated by the CMOS sensor. In another case, when the at least one ADC may be operationally coupled with the distance sensor, the one or more analog signals may correspond to the one or more received signals. Further, the at least one ADC may convert the one or more analog signals into corresponding one or more digital pulses having information regarding the determined distance. In some embodiments, the at least one ADC may be communicatively paired with the one or more processors 108. In some embodiments, the at least one ADC may be configured to feed the converted one or more digital pulses into the one or more processors 108.

In some embodiments, the one or more processors 108 may be operationally coupled with the at least one laser source 104 and the one or more sensors 106. In some embodiments, the one or more processors 108 may include suitable logic, circuitry, and/or interfaces that are operable to execute one or more instructions stored in the memory 110 to perform predetermined operations. In some embodiments, the one or more processors 108 may be configured to decode and execute any instructions received from one or more other electronic devices or server(s). The one or more processors 108 may be configured to execute one or more computer-readable program instructions, such as program instructions to carry out any of the functions described in this description. Further, the one or more processors 108 may be implemented using one or more processor technologies known in the art. Examples of the processor include, but are not limited to, one or more general purpose processors (e.g., INTEL® or Advanced Micro Devices® (AMD) microprocessors) and/or one or more special purpose processors (e.g., digital signal processors or Xilinx® System On Chip (SOC) Field Programmable Gate Array (FPGA) processor).

In some embodiments, the one or more processors 108 may be configured to receive the distance from the one or more sensors 106. Further, the one or more processors 108 may be configured to compare the distance with a predefined threshold value to determine whether the first target is in the far-field or near field. The first target may be determined to be in the far-field when the first target may be at a certain distance above the predefined threshold value and the first target may be determined to be in the near-field when the first target may be at a certain distance below or equal to the predefined threshold value. Thereafter, on determining the first target is in the far-field or near-filed, the one or more processors 108 may be configured to determine a far-field imaging technique or a near-field imaging technique.

In some embodiments, the far-field imaging technique may correspond to capturing information from the first target positioned at a distance above the predefined threshold value. In an exemplary embodiment, the far-field imaging technique may be applied in various applications, selected from a group of applications such as, but is not limited to, astronomy, radar, and photography. In some embodiments, the near-field imaging technique may correspond to capturing information from the first target positioned equal or below a distance below the predefined threshold value. In an exemplary embodiment, the near-field imaging technique may be applied in various applications, selected from a group of applications such as, but is not limited to, microscopy and medical imaging.

In some embodiments, the one or more processors 108 may be configured to operate the at least one laser source 104 in one or more modes based at least on the determination whether the first target is in the far-field or near-field. In some embodiments, the one or more modes may comprise a stable-aimer mode or a flicking-aimer mode. In some embodiments, the one or more processors 108 may be configured to operate the at least one laser source 104 in the flicking-aimer mode on determining the first target is in the far-field. In some embodiments, the one or more processors 108 may be configured to operate the at least one laser source 104 in the stable-aimer mode on determining the first target is in the near-field.

In some embodiments, the at least one laser source 104 may be configured to project a continuous beam or a pulsed beam in the stable-aimer mode or a flicking-aimer mode respectively. In one example embodiment, the at least one laser source 104 projects the laser beam larger than 50 Hz to avoid the flickering from human perception and the projected beam is continuous (not pulsed). In another embodiment, the at least one laser source 104 projects the beam in the frequency lower than ~8-10 Hz to provide flickering perception (pulsating).

As illustrated in FIG. 2A, in the stable-aimer mode, the drive pulse frequency 200 of the at least one laser source 104 may be calibrated to a certain stable frequency. During the stable-aimer mode, the one or more processors 108 may be configured to calibrate the at least one laser source 104 for emitting the laser beam at the certain stable frequency. In some embodiments, the drive pulse frequency may be configured to describe a binary state of the at least one laser source 104. In some embodiments, the laser beam emitted by the at least one laser source 104 in the stable-aimer mode is a dot or a pattern. Further, the dot or the pattern of the emitted laser beam may be visible to a human eye due to operation of the at least one laser source 104 at a high frequency. In some embodiments, the scanner 102 may be configured to scan the first target from a distance below or equal to the predefined threshold value.

As illustrated in FIG. 2B, in the flicking-aimer mode, the drive pulse frequency 200 of the at least one laser source 104 may comprise at least one of a fixed duty cycle 204, a variable duty cycle 206, or a variable frequency 208. In the flicking-aimer mode, the one or more processors 108 may be configured to operate the at least one laser source 104 at a low frequency, as illustrated in FIG. 2B. In some embodiments, the laser beam emitted by the at least one laser source 104 in the flicking-aimer mode is a flicker, an anti-flicker aimer pulse, or a low frequency aimer pulse. In some embodiments, in the flicking-aimer mode, the laser beam corresponds to the anti-flicker aimer pulse in which an individual aimer pulse timing is shifted to avoid an illumination period and sensor exposure period, and the low frequency aimer pulse is added on a top of the anti-flicker aimer pulse to draw user attention in the far field. The anti-flicker aimer pulse defines a frequency around 50 Hertz and the low frequency aimer pulse defines a frequency of below around 10 Hertz. Further, the flicker of the emitted laser beam may not be visible to a human eye due to operation of the at least one laser source 104 at a low frequency. In some embodiments, the scanner 102 may be configured to scan the first target from a distance above the predefined threshold value.

In some embodiments, the flicker of the at least one laser source 104 may correspond to one or more patterns of the at least one laser source 104 during the binary state. In some embodiments, during the fixed duty cycle 204, the one or more processors 108 may be configured to calibrate the at least one laser source 104 to emit the laser beam in a constant flickering pattern. In some embodiments, the constant flickering pattern may represent a constant binary state of the at least one laser source 104 at a fixed time interval.

In some embodiments, during the variable duty cycle 206 or variable frequency 208, the one or more processors may be configured to calibrate the at least one laser source 104 to emit the laser beam in a varying flickering pattern. In some embodiments, the time interval between the binary state of the at least one laser source 104 may correspond to a non-uniform time interval. In some embodiments, during the non-uniform binary state of the at least one laser source 104, the laser beam resembles to a flickering pattern having the variable duty cycle 206 or variable frequency 208.

In some embodiments, the scanner 102 may further comprise at least one receiver (not shown). In some embodiments, the emitted laser beam may be configured to reflect back towards the scanner 102 after striking the first target. In some embodiments, the at least one receiver may correspond to a photodiode configured to capture the reflected laser beam. In some embodiments, the at least one receiver may be operationally coupled with one or more signal conditioners (not shown). Further, the one or more signal conditioners may be configured to alter or amplify one or more signals received from the at least one receiver. In some embodiments, the one or more signals received from the at least one receiver may contain data related to information encoded in the first target.

In some embodiments, the memory 110 may store a set of instructions and data. In some embodiments, the memory 110 may include the one or more instructions that are executable by the one or more processors 108 to perform specific operations. It is apparent to a person with ordinary skill in the art that the one or more instructions stored in the memory 110 enable the hardware of the system to perform the predetermined operations. Some of the commonly known memory implementations include, but are not limited to, fixed (hard) drives, magnetic tape, floppy diskettes, optical disks, Compact Disc Read-Only Memories (CD-ROMs), and magneto-optical disks, semiconductor memories, such as ROMs, Random Access Memories (RAMs), Programmable Read-Only Memories (PROMs), Erasable PROMs (EPROMs), Electrically Erasable PROMs (EE-PROMs), flash memory, magnetic or optical cards, or other type of media/machine-readable medium suitable for storing electronic instructions.

As illustrated in FIG. 1, the one or more processors 108 may be paired with a decoder 112. In some embodiments, the decoder 112 may be configured to receive scanned data from the one or more processors 108. Further, the decoder 112 converts the binary data into alphanumeric characters. In some embodiments, the alphanumeric characters may correspond to information encoded in the first target. In some embodiments, the scanner 102 may further comprise an interface 114. In some embodiments, the interface 114 may be selected from a group of interfaces such as, but is not limited to, an audio/video output device. In some embodiments, the interface 114 may be configured to allow the user to interact with the scanner 102. Thereafter, the interface 114 displays the decoded alphanumeric characters.

As illustrated in FIG. 1, the scanner 102 may comprise an input/output circuity 116 that enables the user to communicate or interface with the scanner 102 via the interface 114. The interface 114 may include N number of user devices (not shown). It may be noted that the input/output circuitry 116 may act as a medium to transmit input from the interface 114 to and from the scanner 102. In some embodiments, the input/output circuitry 116 may refer to the hardware and software components that facilitate the exchange of information between the user and the scanner 102. In one example, the scanner 102 may include a graphical user interface (GUI) (not shown) as input circuitry to allow the user to input data. The input/output circuitry 116 may include various input devices such as keyboards, barcode scanners, GUI for the user to provide data and various output devices such as displays, printers for the user to receive data.

In some embodiments, the scanner 102 may comprise the communication circuitry 118. The communication circuitry 118 may allow the scanner 102 and one or more user devices 122 to exchange data or information with other systems or apparatuses. Further, the scanner 102 may include network interface 120, protocols, and software modules responsible for sending and receiving data or information. In some embodiments, the communication circuitry 118 may include Ethernet ports, Wi-Fi adapters, or communication protocols like HTTP or MQTT for connecting with other systems. The communication circuitry 118 may allow the scanner 102 to stay up-to-date and accurately scan the first target. In some embodiments, the one or more user devices 122 may comprise at least one of one or more mobile phones, laptops, or any other device known in the art.

It will be apparent to one skilled in the art that above-mentioned components of the scanner 102 have been provided only for illustration purposes, without departing from the scope of the disclosure.

FIG. 3 illustrates a flowchart of a method 300 for scanning the first target in accordance with one or more embodiments of the present disclosure.

At operation 302, the laser beam may be emitted onto the first target within the field of view (FOV) by the at least one laser source 102. In some embodiments, the at least one laser source 120 may comprise at least one of a laser aimer, a semiconductor diode laser, a gas laser, a fiber laser, or a quantum cascade laser. For example, the scanner 102 gets activated by pressing at least one push button, upon activation, the at least one laser source 102 emits the laser beam on a barcode printed over a delivery package.

At operation 304, the distance between the scanner 102 and the first target within the FOV may be determined by the one or more sensors 106. In some embodiments, the one or more sensors 106 may comprise at least one of a distance sensor or a CMOS sensor. For example, upon activation of the scanner 102, the distance sensor emits one or more signals towards the barcode printed over the delivery package. In some embodiments, the CMOS sensor generates one or more images of the barcode printed over the delivery package. Further, the CMOS sensor may be configured to extract one or more parameters from the one or more generated images to determine the distance.

At operation 306, the distance is compared with the predefined threshold value by the one or more processors 108 to determine whether the first target is in the far-field. The first target may be determined to be in the far-field when the first target may be at a certain distance above the predefined threshold value. Further, upon determining the distance between the scanner 102 and the first target is above the pre-defined threshold value, the one or more processors 108 may be configured to determine the far-field imaging technique for the first target. For example, the one or more processors 108 compares the determined distance with the predefined threshold value that corresponds to 10 m, to determine that the first target is in the far-field.

At operation 308, the at least one laser source 104 is operated in the flicking-aimer mode by the one or more processors 108 on determining the first target is in the far-field. In some embodiments, the one or more processors 108 may be configured to calibrate the at least one laser source 104 to emit laser beam at a variable duty cycle or variable frequency. For example, the one or more processors 108 may be configured to calibrate the at least one laser source 104 to emit the laser beam at a variable duty cycle 206 or a variable frequency 208, in the flicking-aimer mode. In some embodiments, the laser beam emitted by the at least one laser source 104 in the flicking-aimer mode is a flicker, an anti-flicker aimer pulse, or a low frequency aimer pulse. In some embodiments, the flicker of the emitted laser beam may not be visible to a human eye due to operation of the at least one laser source 104 at a low frequency.

In some embodiments, during the variable duty cycle 206 or variable frequency 208, the one or more processors may be configured to calibrate the at least one laser source 104 to emit the laser beam in a varying flickering pattern. In some embodiments, the time interval between the binary state of the at least one laser source 104 may correspond to a non-uniform time interval. In some embodiments, during the non-uniform binary state of the at least one laser source 104, the laser beam resemble to a flickering pattern having the variable duty cycle 206 or variable frequency 208.

FIG. 4 illustrates a flowchart of a method 400 for scanning the first target in accordance with one or more embodiments of the present disclosure.

At operation 402, the scanner 102 is triggered by pressing of at least one push button. In some embodiments, the at least one push button may be configured to trigger the scanner 102 upon application of an external force. For example, the scanner 102 gets triggered by the user, while pointing the scanner 102 towards a barcode that requires to be scanned.

At operation 404, the one or more sensors 106 gets actuated upon triggering the scanner 102. In some embodiment, the one or more sensors 106 gets activated to determine distance between the scanner 102 and the first target, as described above at step 302. For example, upon pointing the scanner 102 towards the first target, the distance sensor activates to emit IR signals towards the first target and receive the IR signals back that get reflected from the first target to determine the distance between the scanner 102 and the first target. For example, the determined distance between the scanner 102 and the first target is 4 meters (m).

At operation 406, the one or more processors 108 determine whether the first target is near to the scanner 102. In some embodiments, the determined distance is compared with the predefined threshold value by the one or more processors 108 to determine whether the first target is near to the scanner 102. In some embodiments, the one or more processors 108 may be configured to compare the determined distance with the predefined threshold value as described above at step 304. For example, the determined distance of 4 m is compared with the predefined threshold value of 10 m.

At operation 408, when the first target is near to the scanner 102, then the one or more processors 108 may operate the at least one laser source 108 in the stable-aimer mode. For example, upon determining the first target is near to the scanner 102, the one or more processors 108 determines that the first target is in the near-field. For example, the distance of 4 m is less than the predefined threshold value of 10 m. In one example embodiment, during the stable-aimer mode, the one or more processors 108 calibrates the at least one laser source 104 to emit the laser beam at a certain stable frequency 202. Further, the laser beam emitted by the at least one laser source 104 in the stable-aimer mode is a dot or a pattern.

At operation 410, when the first target is not near to the scanner 102, then the one or more processors 108 may operate the at least one laser source 108 in the flicking-aimer mode. For example, upon determining the first target is not near to the scanner 102, the one or more processors 108 determines that the first target is in the far-field. For example, the distance of 12 m is above the predefined threshold value of 10 m. In an example embodiment, during the flicking-aimer mode, the one or more processors 108 calibrates the at least one laser source 102 to emit the laser beam at a variable duty cycle 206 or variable frequency 208, as explained at step 306. For example, while operating at the variable duty cycle 206 or variable frequency 208, the laser beam emitted by the at least one laser source 104 in the flicking-aimer mode is a flicker, an anti-flicker aimer pulse, or a low frequency aimer pulse.

At operation 412, encoded data of the first target captured by the scanner 102 in the flicking-aimer mode or stable-aimer mode, is decoded by a decoder 112. In some embodiments, the decoder 112 may be configured to convert the captured encoded data into alphanumeric characters. For example, the decoder 112 converts the combination of bars and spaces of a barcode into readable alphanumeric characters.

At operation 414, the decoded data of the first target is processed to provide readable alphanumeric characters. For example, the processed information includes information about the manufacturing date and selling price of a package. At operation 416, the processed information is sent to an interface for displaying it to the user. For example, the interface may be a user interface or an audio/video output device. For example, the interface may provide the manufacturing date and the selling price of the package.

Embodiments may be configured to enhance the working range of distance of the scanner. Embodiments may enhance readability of the first target and make the first target easy to decode. The one or more processors 108 may be coupled with the one or more sensors 106 for determining whether the first target is in the far-field or near-field. The one or more processors 108 operates the at least one laser source 104 in a flicker-aimer mode on determining the first target is in the far-field or in a stable-aimer mode on determining the first target is in the near-field. The extended working range of the scanner 102 may enhance the efficiency of the scanner 102. Thus, the operation of the at least one laser source 104 during the far-field or near-field may increase readability of the first target and make the first target easy to be decoded by the scanner 102.

As will be appreciated by one skilled in the art, aspects of the present disclosure may be embodied as a system, method, or computer program product. Accordingly, aspects of various embodiments may take the form of an entirely hardware embodiment, an entirely software embodiment (including firmware, resident software, micro-code, etc.) or an embodiment combining software and hardware aspects that may all generally be referred to herein as a "circuit," "module", "system" or "sub-system." In addition, aspects of the present disclosure may take the form of a computer program product embodied in one or more computer readable medium(s) having computer readable program code embodied thereon.

The foregoing descriptions of specific embodiments have been presented for purposes of illustration and description. They are not intended to be exhaustive or to limit the embodiments to the precise forms disclosed, and obviously many modifications and variations are possible in light of the above teaching. The embodiments were chosen and described in order to best explain principles and practical applications thereof, and to thereby enable others skilled in the art to best utilize the various embodiments with various modifications as are suited to the particular use contemplated. It is understood that various omissions and substitutions of equivalents are contemplated as circumstances may suggest or render expedient, but these are intended to cover the application or implementation without departing from the spirit or scope of the claims. The following claims are in no way intended to limit the scope of embodiments to the specific embodiments described herein.

What is claimed is:

1. A scanner comprising:

a laser source configured to emit a laser beam onto a first target within a field of view (FOV);

one or more sensors configured to determine a distance between the scanner and the first target within the FOV; and, one or more processors operationally coupled with the laser source and the one or more sensors, wherein the one or more processors are configured to:

receive the distance from the one or more sensors;

compare the distance with a predefined threshold value to determine whether the first target is in a far-field;

operate the laser source in a stable-aimer mode on determining that the first target is in a near field;

operate the laser source in a flicking-aimer mode on determining the first target is in the far-field.

2. The scanner of claim 1, wherein the one or more sensors comprises at least one of a distance sensor or a complementary metal-oxide-semiconductor (CMOS) sensor.

3. The scanner of claim 2, wherein the CMOS sensor is configured to determine one or more parameters associated with images of the first target generated by the CMOS sensor, for determining the distance between the scanner and the first target.

4. The scanner of claim 3, wherein the one or more parameters associated with the images comprises at least one of exposure time, gain, or white value.

5. The scanner of claim 1, wherein the one or more processors are further configured to:

compare the distance with the predefined threshold value to determine whether the first target is in a near-field.

6. The scanner of claim 5, wherein the one or more processors are further configured to:

determine, on determining the distance is above the predefined threshold value, the first target is in the far-field; and, determine, on determining the distance between the scanner and the first target is below or equal to the predefined threshold value, the first target is in the near-field.

7. The scanner of claim 5, wherein the laser beam emitted by the laser source in the stable-aimer mode is a dot or a pattern.

8. The scanner of claim 1, wherein the laser beam emitted by the laser source in the flicking-aimer mode is a flicker, an anti-flicker aimer pulse, or a low frequency aimer pulse.

9. The scanner of claim 8, wherein, in the flicking-aimer mode, a drive pulse frequency of the laser source comprises at least one of a fixed duty cycle, a variable duty cycle, or a variable frequency.

10. The scanner of claim 8, wherein, in the flicking-aimer mode, the laser beam corresponds to the anti-flicker aimer pulse in which an individual aimer pulse timing is shifted to avoid an illumination period and sensor exposure period, and the low frequency aimer pulse is added on a top of the anti-flicker aimer pulse to draw user attention in the far-field.

11. The scanner of claim 10, wherein the anti-flicker aimer pulse defines a frequency around 50 Hertz or higher and the low frequency aimer pulse defines a frequency of below around 10 Hertz.

12. The scanner of claim 1, wherein the laser source comprises at least one of a laser aimer, a semiconductor diode laser, a gas laser, a fiber laser, or a quantum cascade laser.

13. A method comprising:

emitting, with a laser source, a laser beam onto a first target within a field of view (FOV);

determining, via one or more sensors, a distance between a scanner and the first target within the FOV;

comparing, via one or more processors, the distance with a predefined threshold value, to determine whether the first target is in a far-field;

operating the laser source in a stable-aimer mode on determining that the first target is in a near field; and operating, via the one or more processors, the laser source in a flicking-aimer mode on determining the first target is in the far-field.

14. The method of claim 13, wherein the one or more sensors comprises at least one of a distance sensor or a complementary metal-oxide-semiconductor (CMOS) sensor.

15. The method of claim 14, wherein the CMOS sensor is configured to determine one or more parameters associated with images of the first target generated by the CMOS sensor, for determining the distance between the scanner and the first target.

16. The method of claim 15, wherein the one or more parameters associated with the images comprises at least one of exposure time, gain, or white value.

17. The method of claim 13 further comprising:

comparing, via the one or more processors, the distance with the predefined threshold value, to determine whether the first target is in a near-field.

18. The method of claim 17, wherein the one or more processors are configured to determine, on determining the distance between the scanner and the first target is above the predefined threshold value, the first target is in the far-field, and wherein determine, on determining the distance between the scanner and the first target is below or equal to the predefined threshold value, the first target is in the near-field.

19. The method of claim 17, wherein the laser beam emitted by the laser source in the stable-aimer mode is a dot or a pattern.

20. The method of claim 13, wherein the laser beam emitted by the laser source in the flicking-aimer mode is a flicker, an anti-flicker aimer pulse, or a low frequency aimer pulse.

* * * * *